United States Patent
Takezawa et al.

(10) Patent No.: US 12,283,437 B2
(45) Date of Patent: Apr. 22, 2025

(54) ELECTROLYTIC CAPACITOR

(71) Applicant: SUN Electronic Industries Corp., Shijonawate (JP)

(72) Inventors: Takashi Takezawa, Shijonawate (JP); Masakazu Hosogi, Shijonawate (JP); Hirokazu Nishikori, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 0 days.

(21) Appl. No.: 18/411,285

(22) Filed: Jan. 12, 2024

(65) Prior Publication Data

US 2024/0194415 A1    Jun. 13, 2024

Related U.S. Application Data

(63) Continuation of application No. 17/642,164, filed as application No. PCT/JP2020/028979 on Jul. 29, 2020, now Pat. No. 11,915,887.

(30) Foreign Application Priority Data

Sep. 13, 2019 (WO) .................. PCT/JP2019/036149

(51) Int. Cl.
*H01G 9/145* (2006.01)
*H01G 9/02* (2006.01)
(Continued)

(52) U.S. Cl.
CPC .............. *H01G 9/145* (2013.01); *H01G 9/02* (2013.01); *H01G 9/035* (2013.01); *H01G 9/048* (2013.01); *H01G 9/10* (2013.01)

(58) Field of Classification Search
CPC ............ H01G 9/10; H01G 9/035; H01G 9/02; H01G 9/145
See application file for complete search history.

(56) References Cited

U.S. PATENT DOCUMENTS 6,128,179 A    10/2000  Morokuma
11,380,493 B2   7/2022  Takezawa et al.
(Continued)

FOREIGN PATENT DOCUMENTS

CN    101057306 A    10/2007
EP      1580773 A1    9/2005
(Continued)

OTHER PUBLICATIONS

International Search Report (with partial translation) dated Oct. 13, 2020, issued in corresponding International Patent Application No. PCT/JP2020/028979.
(Continued)

*Primary Examiner* — David M Sinclair
(74) *Attorney, Agent, or Firm* — Morgan, Lewis & Bockius LLP

(57) ABSTRACT

A capacitor 1 includes a capacitor element 3 holding solution between an anode foil 5 and a cathode foil 7 that are wound up with a separator 6 in between, a body case 2 for housing the capacitor element 3, and a sealing member 4 for sealing the body case 2. A part of the separator 6 makes contact, at a plurality of points or over an area, with the face of the sealing member 4 facing the capacitor element 3 so as to rest on that face. The solution contains, dissolved in a lipophilic solvent, deterioration preventing agent that solidifies by oxidation. The solution is supplied through the separator 6 to the sealing member 4 and permeates the sealing member 4, so that a coating 17 resulting from the agent solidifying coats the outer face of the sealing member 4, leaving the solution present in the sealing member 4.

14 Claims, 3 Drawing Sheets

(51) Int. Cl.
  *H01G 9/035* (2006.01)
  *H01G 9/048* (2006.01)
  *H01G 9/10* (2006.01)

(56) References Cited

U.S. PATENT DOCUMENTS

| | | | |
|---|---|---|---|
| 11,642,101 B2 * | 5/2023 | Ebata | A61B 8/4245 600/443 |
| 11,915,887 B2 * | 2/2024 | Takezawa | H01G 9/048 |
| 2012/0300368 A1 | 11/2012 | Matsuura et al. | |
| 2013/0027846 A1 | 1/2013 | Ashino et al. | |
| 2015/0255220 A1 | 9/2015 | Komatsu et al. | |
| 2016/0099114 A1 | 4/2016 | Komatsu et al. | |
| 2017/0162341 A1 | 6/2017 | Ashino et al. | |
| 2021/0005394 A1 | 1/2021 | Will et al. | |
| 2021/0327653 A1 | 10/2021 | Takezawa et al. | |

FOREIGN PATENT DOCUMENTS

| | | |
|---|---|---|
| EP | 1993113 A1 | 11/2008 |
| EP | 2506275 A1 | 10/2012 |
| EP | 3855464 A1 | 7/2021 |
| GB | 2041646 A | 9/1980 |
| JP | H028365 U | 1/1990 |
| JP | H0393702 U | 9/1991 |
| JP | 03-099427 U | 10/1991 |
| JP | 04-206708 A | 7/1992 |
| JP | 05-038866 U | 5/1993 |
| JP | 09-275037 A | 10/1997 |
| JP | 2000-100670 A | 4/2000 |
| JP | 2005-209902 A | 8/2005 |
| JP | 2006-120830 A | 5/2006 |
| JP | 2007-019230 A | 1/2007 |
| JP | 2009-272320 A | 11/2009 |
| JP | 2015-162471 A | 9/2015 |
| JP | 2016-076562 A | 5/2016 |
| JP | 2016-076663 A | 5/2016 |
| JP | 2016-134406 A | 7/2016 |
| JP | 2017/069390 A | 4/2017 |
| WO | 2014/050913 A1 | 4/2014 |

OTHER PUBLICATIONS

Extended European Search Report dated May 17, 2023, issued in corresponding European Patent Application No. 19945120.4.

Office Action dated May 5, 2023, issued in corresponding U.S. Appl. No. 17/642,101.

Office Action dated Jul. 4, 2023, issued in corresponding Japanese Patent Application No. 2021-545080.

Office Action dated Oct. 27, 2023, issued in corresponding U.S. Appl. No. 17/642,101.

Office Action dated Nov. 26, 2024, issued in corresponding Japanese Patent Application No. 2021-545156.

\* cited by examiner

ELECTROLYTIC CAPACITOR

RELATED APPLICATION DATA

This application is a continuation application of U.S. patent application Ser. No. 17/642,164, filed Mar. 10, 2022, which is a § 371 national stage application of PCT/JP2020/028979, filed Jul. 29, 2020, which is based on and claims priority to PCT/JP2019/036149, filed Sep. 13, 2019, the entire contents of each of these applications are incorporated herein by reference.

TECHNICAL FIELD

The present invention relates to a capacitor that is sealed with a sealing member.

BACKGROUND ART

A known capacitor is disclosed in Patent Document 1. This capacitor has a body case, a capacitor element, and a sealing member. The body case is formed of metal in the shape of a bottomed cylinder, and its cylindrical circumferential wall is closed at one end and is open at the other end to have an opening.

The capacitor element has an anode foil and a cathode foil, each having an oxide film formed on it, wound up with a separator in between, and is housed is the body case. Between the anode and cathode foils, an electrolytic solution is held. The anode and cathode foils each have a lead terminal connected to it. The opening of the body case with the capacitor element housed in it is sealed with a sealing member formed of, for example, rubber, and the lead terminals penetrate the sealing member to be led out of the body case.

It is believed that, when a polymer such as rubber is exposed to the energy of heat or light in the presence of oxygen as in air or elsewhere, it is triggered by generation of radicals to initiate a chain of oxidation reactions, resulting in degraded properties. To cope with that, mention is often made of mixing into the sealing member an anti-aging agent for suppressing oxidation reactions.

Patent Documents 2 and 3 disclose a capacitor that has a solid electrolyte instead of an electrolytic solution. These capacitors have a body case, a capacitor element, and a sealing member like those of the capacitor of Patent Document 1. Between the anode and cathode foils of the capacitor element, an electrically conductive polymer as a solid electrolyte is held. In the capacitors so structured, the electrically conductive polymer contributes to a low ESR.

In the capacitor of Patent Document 3, between the anode and cathode foils, a functional liquid (e.g., water) is held. The functional liquid helps repair defects in the oxide film formed on the anode and cathode foils.

CITATION LIST

Patent Literature

Patent Document 1: Unexamined Japanese Patent Application Publication No. 2000-100670 (pages 2-4, FIG. 1).
Patent Document 2: Unexamined Japanese Patent Application Publication No. 2016-76562 (pages 7-16, FIG. 2).
Patent Document 3: Internationally Published PCT Application No. 2014/050913 (pages 9-23, FIG. 2).

SUMMARY OF INVENTION

Technical Problem

Today, with the trend of diminishing the size and increasing the performance of the devices that incorporate them, capacitors are used increasingly in high-temperature environments, where they are arranged near motors, engines, fast-operation semiconductor devices, and the like that produce large amounts of heat.

With the capacitor disclosed in Patent Document 1 mentioned above, the anti-aging agent mixed in the sealing member is consumed as it exerts an antioxidant effect: that is, it is gradually depleted. In the capacitor used in a high-temperature environment, as the anti-aging agent is depleted, the sealing member deteriorates rapidly. This often causes the electrolytic solution to evaporate out of the body case, eventually bringing what is called a dried-up state. Hence the problem of the capacitor being unable to maintain its characteristics stably for a long period.

Likewise, with the capacitor disclosed in Patent Document 3 mentioned above, using it in a high-temperature environment leads to deterioration of the sealing member. As a result, the functional liquid held between the anode and cathode foils leaks out of the body case, no longer able to repair the oxide film. Hence the problem of the capacitor being unable to maintain its characteristics stably for a long period.

This is true not only with a functional liquid that repairs oxide film: also with a functional liquid having a function of enhancing the characteristics of a capacitor, likewise, leakage of the functional liquid leads to the capacitor being unable to maintain its characteristics stably for a long period.

An object of the present invention is to provide a capacitor that can maintain its characteristics stably for a long period.

Solution to Problem

To achieve the above object, according to one aspect of the present invention, a capacitor includes: a capacitor element holding a predetermined solution between an anode foil and a cathode foil that are wound up with a separator in between: a body case for housing the capacitor element: and a sealing member for sealing the body case. A part of the separator makes contact, at a plurality of points or over an area, with the face of the sealing member facing the capacitor element so as to rest on that face. The solution contains, dissolved in a lipophilic solvent, a sealing member deterioration preventing agent that solidifies by oxidation. The solution is supplied through the separator to the sealing member and permeates the sealing member, so that a coating resulting from the sealing member deterioration preventing agent solidifying coats the outer face of the sealing member, leaving the solution present in the part of the sealing member closer to the capacitor element than the coating.

According to another aspect of the present invention, in the capacitor described above, the sealing member deterioration preventing agent may be a terpenoid, an unsaturated fatty acid, a saturated fatty acid, or a derivative of any of those.

According to another aspect of the present invention, in the capacitor described above, the sealing member deterioration preventing agent may be a lipid-soluble vitamin.

According to another aspect of the present invention, in the capacitor described above, the solution may be an electrolytic solution having the sealing member deterioration preventing agent and an electrolyte dissolved in the lipophilic solvent.

According to another aspect of the present invention, in the capacitor described above, the concentration of the sealing member deterioration preventing agent in the electrolytic solution may be from 1% by weight to 90% by weight.

According to another aspect of the present invention, in the capacitor described above, the concentration of the sealing member deterioration preventing agent in the electrolytic solution may be from 3% by weight to 80% by weight.

According to another aspect of the present invention, in the capacitor described above, the lipophilic solvent may be gamma-butyrolactone.

According to another aspect of the present invention, in the capacitor described above, the lipophilic solvent may contain at least one of sulfolane, ethylene glycol, and diethylene glycol along with a nonionic surfactant.

According to another aspect of the present invention, in the capacitor described above, the lipophilic solvent may be polyethylene glycol having a lipophilic group bonded thereto, or a copolymer of polyethylene glycol with polypropylene glycol According to another aspect of the present invention, in the capacitor described above, the width of the separator in the lateral direction may be greater than the width of the anode and cathode foils in the lateral direction, and the separator may protrude beyond the anode and cathode foils toward the sealing member.

According to another aspect of the present invention, in the capacitor described above, a central part of the face of the sealing member facing the capacitor element protrudes relative to a peripheral part thereof.

According to another aspect of the present invention, in the capacitor described above, the body case may have a constriction that protrudes from an inner face of the body case and that presses the outer circumferential face of the sealing member, and the ridge of the constriction may be located farther from the capacitor element than the middle of the sealing member in its thickness direction.

Advantageous Effects of Invention

According to the present invention, a capacitor element holds a solution having a sealing member deterioration preventing agent dissolved in a lipophilic solvent, and a separator makes contact, at a plurality of points or over an area, with the face of a sealing member facing the capacitor element so as to rest on that face. The sealing member is permeated with the solution supplied through the separator, and the outer face of the sealing member is coated with a coating resulting from the sealing member deterioration preventing agent solidifying by oxidation. This makes it possible to suppress deterioration of the sealing member through oxidation for a long period. It is thus possible to prevent the solution held in the capacitor element from leaking out, and to maintain the characteristics of the capacitor stably for a long period.

DESCRIPTION OF EMBODIMENTS

First Embodiment

Figure 1:
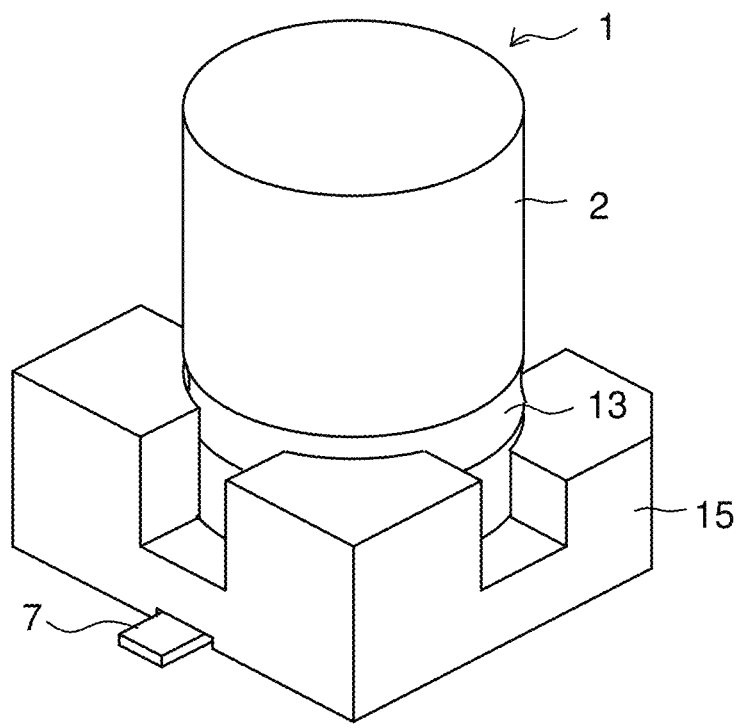
FIG. 1 is a perspective view of a capacitor according to a first embodiment of the present invention, as seen from above.
Figure 2:
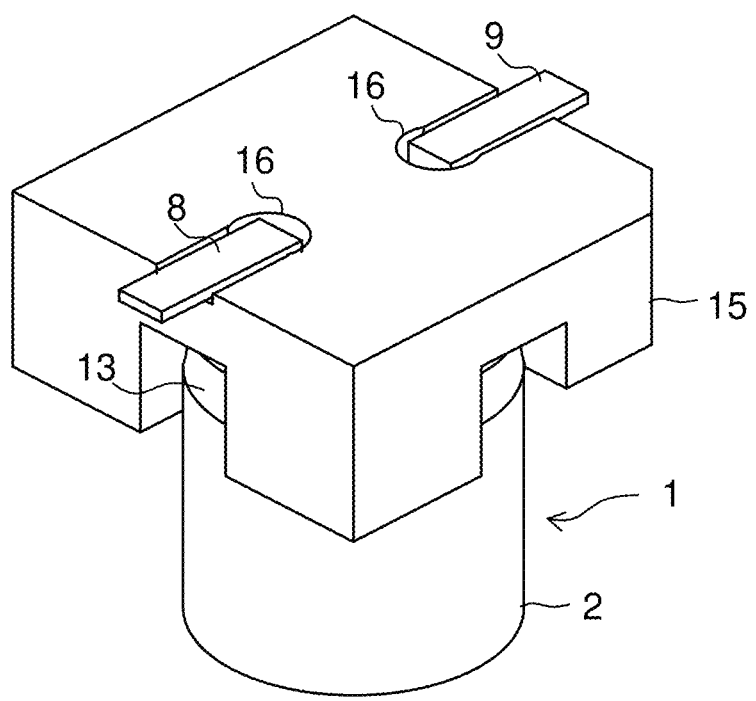
FIG. 2 is a perspective view of a capacitor according to the first embodiment of the present invention, as seen from below.

Embodiments of the present invention will be described below with reference to the accompanying drawings. FIGS. 1 and 2 are perspective views of a capacitor 1 according to a first embodiment, as seen from above and from below respectively. The capacitor 1 is an electrolytic capacitor, and is mounted on a seat plate 15. The seat plate 15 is formed of synthetic resin, and holds the capacitor 1. The seat plate 15 has a pair of through holes 16 formed in it.

The capacitor 1 has lead terminals 8 and 9. The lead terminals 8 and 9 are laid through the through holes 16 in the seat plate 15, and are bent outward. Thus the capacitor 1, held at its top face by an automated machine, can be positioned on a circuit board and mounted on it with the lead terminals 8 and 9 soldered to lands on the circuit board.

Figure 3:
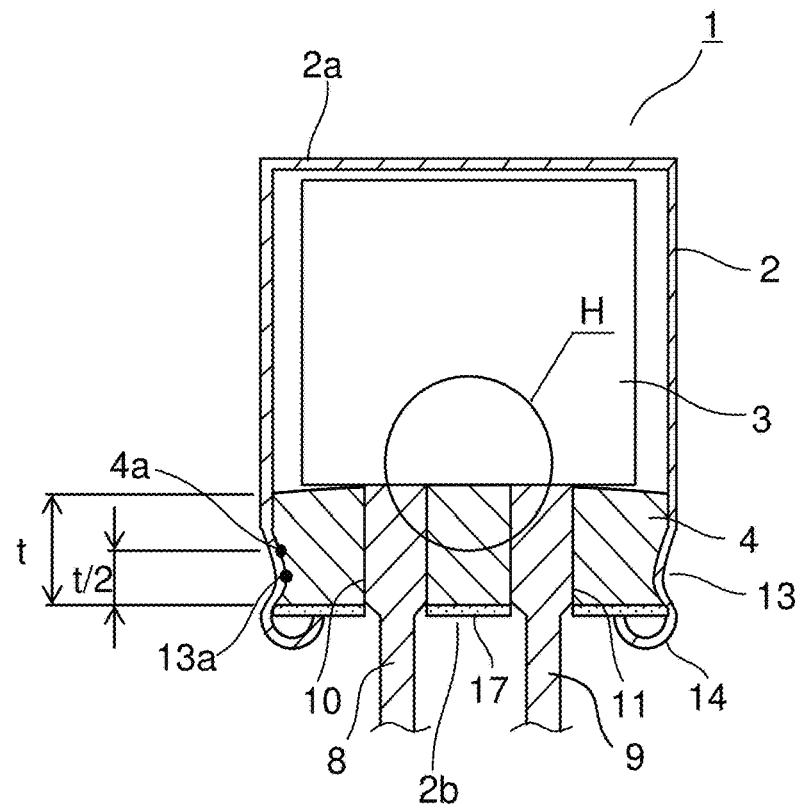
FIG. 3 is a front sectional view of a capacitor according to the first embodiment of the present invention.

FIG. 3 is a front sectional view of the capacitor 1. The capacitor 1 includes a body case 2, a capacitor element 3, and a sealing member 4. The body case 2 is formed of metal such as aluminum in the shape of a bottomed cylinder with a circular cross section, closed at one end with a top wall 2a and open at the other end to have an opening 2b. The capacitor element 3 is housed in the body case 2, and the opening 2b is sealed with the sealing member 4.

Figure 4:
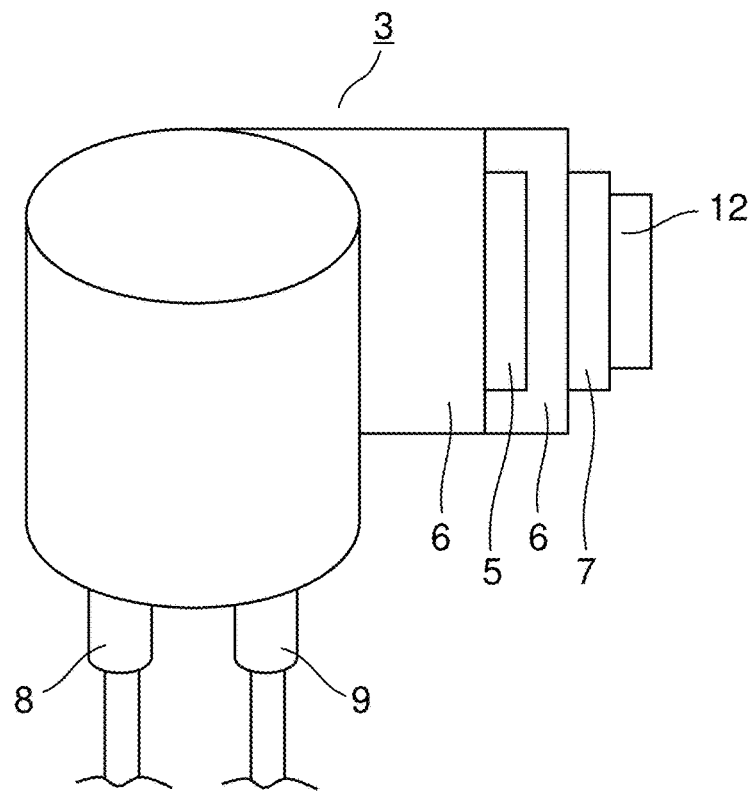
FIG. 4 is a perspective view of a capacitor element of a capacitor according to the first embodiment of the present invention.

FIG. 4 is a perspective view of the capacitor element 3. The capacitor element 3 includes an anode foil 5, a cathode foil 7, and a separator 6. The anode and cathode foils 5 and 7 are each formed of metal foil in the form of an elongate band. The separator 6 is formed of nonwoven fabric or the like in the form of an elongate band.

The capacitor element 3 is formed by winding up the anode and cathode foils 5 and 7, with the separator 6 in between, into a cylindrical shape. The anode foil 5, the cathode foil 7, and the separator 6, each in the shape of a band, are elongate in the winding direction (longitudinal direction, machine direction), and their width in the direction (lateral direction, cross direction) orthogonal to the winding direction is smaller than their length in the winding direction. The anode or cathode foil 5 or 7 is at its terminal end fastened with tape 12. The anode foil 5 has the lead terminal 8 connected to it, and the cathode foil 7 has the lead terminal 9 connected to it.

The separator 6 is formed such that its width in the lateral direction (axial direction) is greater than the width of the anode and cathode foils 5 and 7 in the lateral direction. Thus the separator 6 protrudes, beyond the anode and cathode foils 5 and 7, upward (toward the top wall 2a) and downward (toward the opening 2b), thereby preventing short-circuiting between the anode and cathode foils 5 and 7.

The anode foil 5 is formed of a valve metal such as aluminum, tantalum, niobium, or titanium. The cathode foil 7 faces the anode foil 5 across the separator 6, and is formed of aluminum or the like. The anode and cathode foils 5 and 7 have an oxide film (not illustrated) formed on their surfaces.

Between the anode and cathode foils 5 and 7 of the capacitor element 3, an electrolytic solution is held. Immersing the capacitor element 3 in the electrolytic solution for a predetermined length of time permits the electrolytic solution to permeate the separator 6, to be held between the anode and cathode foils 5 and 7. The electrolytic solution functions as the cathode in practical terms. The electrolytic solution also helps repair defects in the oxide film on the anode and cathode foils 5 and 7.

The electrolytic solution is a solution of an electrolyte and a sealing member deterioration preventing agent in a lipophilic solvent. In this embodiment, as the lipophilic solvent, gamma-butyrolactone is used. Also usable is a lipophilic solvent containing at least one of sulfolane, ethylene glycol, and diethylene glycol along with a nonionic surfactant. Also usable as the lipophilic solvent is polyethylene glycol having a lipophilic group bonded to it, or a copolymer of polyethylene glycol with polypropylene glycol.

The electrolyte, by dissolving into the solvent, dissociates into ions to exert electrical conductivity. Usable as the electrolyte is, for example, an organic amine salt of a boric acid compound or of a carbonic acid compound.

The sealing member deterioration preventing agent is soluble in a lipophilic solvent, and is a compound that solidifies through a chain of reactions based on oxidation in the presence of oxygen. Usable as the sealing member deterioration preventing agent is a terpenoid such as a lipid-soluble vitamin containing an isoprene skeleton (of which the main chain may have single or double bonds or may have a ring structure) within the molecule, an unsaturated fatty acid, a polyglycerol ester containing a unsaturated fatty acid group within the molecule, a saturated fatty acid, or a derivative of any of those. To ease dissolution of such a sealing member deterioration preventing agent in the lipophilic solvent, an amphiphilic compound may be added.

Examples of lipophilic vitamins that solidify by oxidation include vitamin A, vitamin D, vitamin E, and vitamin K. Vitamin A is a compound that contains a carotenoid skeleton, and includes retinol, β-carotene, α-carotene, β-cryptoxanthin, and astaxanthin. Vitamin D includes vitamin D2 and vitamin D3. Vitamin E includes tocopherols (α-tocopherol, β-tocopherol, γ-tocopherol, δ-tocopherol) and tocotrienols (α-tocotrienols, β-tocotrienols, γ-tocotrienols, and δ-tocotrienols). Vitamin K includes vitamin K1, vitamin K2, and menaquinone-7. Except α-tocopherol, these lipophilic vitamins have a double bond other than an aromatic ring within the molecule, and solidify easily by oxidation. Although α-tocopherol does not have a double bond other than an aromatic ring within the molecule, it solidifies by oxidation at a high temperature.

These lipophilic vitamins are terpenoids that contain an isoprene skeleton within the molecule, and have high affinity for the sealing member 4, which is formed of rubber. Accordingly, for satisfactory permeation and retention in the sealing member 4, it is preferable to use a lipophilic vitamin as the sealing member deterioration preventing agent. It is preferable that the lipophilic vitamin contain two or more isoprene units, and more preferably three or more isoprene units. Vitamin A and vitamin E are particularly preferable for their strong antioxidant property.

Compounds such as unsaturated fatty acids contained in drying oil and polyglycerol esters containing an unsaturated fatty acid group within the molecule (polyglycerol fatty acid esters) have a plurality of double or triple bonds within the molecule. Accordingly, these compounds are liable to solidify as they react with oxygen in air, as a result of fatty acid groups bonding together and increasing their molecular weights. Examples of such compounds include tetraglycerol triesters containing oleic acid as a fatty acid group (e.g., tetraglycerol triester of oleic acid).

Saturated fatty acids, and derivatives of saturated fatty acids such their ester compounds, have the property of solidifying as a result of carbonyl groups within the molecule being oxidized in a high-temperature environment of, for example, 160° C. in the presence of oxygen.

In FIG. 3, the sealing member 4 is formed as a molding of an electrically insulating elastic material in the shape of a circular disc having a pair of through holes 10 and 11 formed in it. The lead terminals 8 and 9 of the capacitor element 3 are pressed through the through holes 10 and 11. Usable for the sealing member 4 is butyl rubber, silicone rubber, fluorine-containing rubber, or the like.

Among those, butyl rubber is preferred because it is high in environmental resistance, such as heat aging resistance, chemical resistance, and weather resistance, high in electrical resistance, and low in gas permeation. Silicone rubber and fluorine-containing rubber, though less airtight than butyl rubber, can be given higher airtightness by coating the outer face of the sealing member 4 with a coating 17, which will be described later.

The sealing member 4 may contain an anti-aging agent. Adding an anti-aging agent to the sealing member 4 helps suppress oxidation of rubber even before the formation of the coating 17. After the formation of the coating 17, the coating 17 serves to suppress consumption of the anti-aging agent, and this helps suppress chemical reactions of the sealing member 4 in a high-temperature environment for a long period.

With the sealing member 4 placed in the opening 2b of the body case 2, the body case 2 is swaged from outside its outer circumferential face. This forms a constriction (inward bead) 13 that protrudes inward of the body case 2. The constriction 13 constricts the outer circumferential face of the sealing member 4 inward, and thereby brings it into close contact with the inner circumferential face of the body case 2. Moreover, constricting the sealing member 4 brings the inner faces of the through holes 10 and 11 into close contact with the lead terminals 8 and 9. Thus the opening 2b is sealed with the sealing member 4 so that the electrolytic solution held in the capacitor element 3 may not leak out of the body case 2.

Here, the ridge 13a of the constriction 13 is arranged farther from the capacitor element 3 than the middle 4a of the sealing member 4 in its thickness direction (i.e., assuming that the sealing member 4 has a thickness t, the position t/2 away from its bottom). Thus the outer circumferential face of the sealing member 4 is pressed from below as viewed in the illustration, with the result that the top face (facing the capacitor element 3) of the sealing member 4 bulges to be convex upward such that a central part of it protrudes relative to a peripheral part toward the capacitor element 3.

The open end of the body case 2 is folded onto the outer face (facing away from the capacitor element 3) of the sealing member 4 to form a replication portion 14. The replication portion 14 and the constriction 13 prevent the sealing member 4 from dropping out of the body case 2.

Figure 5:
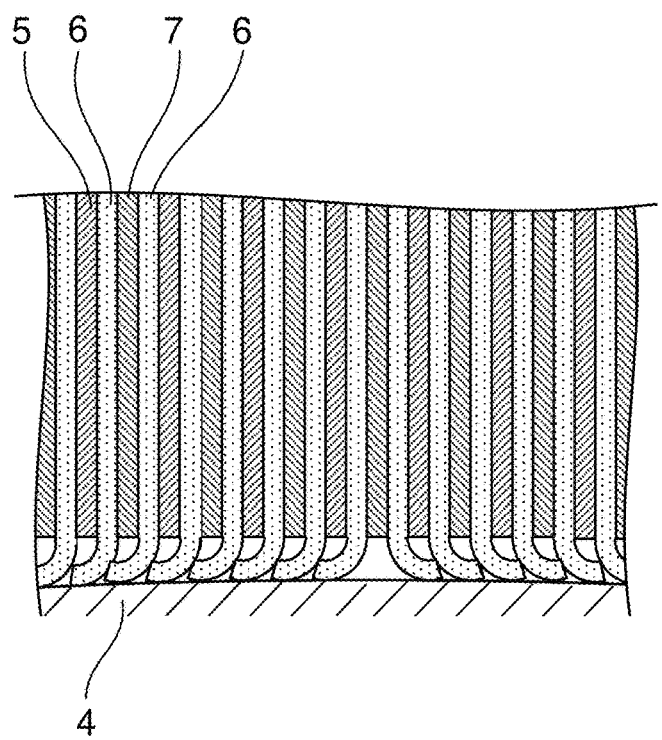
FIG. 5 is a detailed view of part H in FIG. 3.

FIG. 5 is a detailed view of part H in FIG. 3. At least part of the separator 6, which protrudes downward beyond the anode and cathode foils 5 and 7, makes contact, at a plurality of points or over an area, with the top face (facing the capacitor element 3) of the sealing member 4 so as to rest on that face. Here, since the top face of the sealing member 4 bulges such that a central part of it protrudes upward, the separator 6 reliably makes contact with the sealing member 4 at a plurality of points or over an area so as to rest on it.

It is preferable that the width of the separator 6 in the lateral direction be 0.15 mm to 2.0 mm greater than the width of the anode and cathode foils 5 and 7. With a width greater by 0.15 mm or more, and more preferably greater by 0.2 mm or more, the separator 6 can bend such that a bottom end part of the separator 6 reliably makes contact with the top face of the sealing member 4 without applying stress to the anode and cathode foils 5 and 7.

The sealing member 4 is constantly supplied with the electrolytic solution through the separator 6. The electrolytic solution permeates the sealing member 4 through intermolecular gaps inside it to reach the outer face (facing away from the capacitor element 3) of the sealing member 4. The outer face of the sealing member 4 is coated with the coating 17 (see FIG. 3) resulting from the sealing member deterioration preventing agent solidifying by oxidation. Here, the electrolytic solution is present in the part of the sealing member 4 closer to the capacitor element 3 than the coating 17.

For satisfactory permeation, it is preferable that the molecular weight of the sealing member deterioration preventing agent be 3000 or less, and more preferably 2000 or less. For satisfactory retention in the sealing member 4, it is preferable that the molecular weight of the sealing member deterioration preventing agent be 200 or more, more preferably 250 or more, and particularly preferably 300 or more. Using a sealing member deterioration preventing agent with a molecular weight in such ranges provides satisfactory permeation in the sealing member 4 combined with long-term retention of the sealing member deterioration preventing effect.

Using two or more sealing member deterioration preventing agents with different molecular weights allows adjustment of their permeation and retention in the sealing member 4.

For proper adjustment of the balance between the amount of sealing member deterioration preventing agent in the electrolytic solution and its amount permeating the sealing member 4, it is preferable that the solubility parameter (SP value) of the sealing member deterioration preventing agent fall between the SP value of the lipophilic solvent and the SP value of the sealing member 4. For long-term retention of the sealing member deterioration preventing agent in the sealing member 4, it is preferable that the boiling point of the sealing member deterioration preventing agent be higher than that of the lipophilic solvent.

It is preferable that the sealing member deterioration preventing agent be a compound that is oxidized more easily than the ingredients of the sealing member 4 in a temperature range of 150° C. or less. Any compound other than those generally known as antioxidants, if it is oxidized more easily than the ingredients of the sealing member 4, can be used as the sealing member deterioration preventing agent. Preferable examples of such compounds include compounds that exert an antioxidant effect and compounds that contain a double bond within the molecule. Particularly preferable is a compound that exerts an effect of stabilizing or eliminating the radicals arising from the sealing member deterioration preventing agent, because it enhances the sealing member deterioration preventing effect.

Then, even if oxygen permeates the sealing member 4, the sealing member deterioration preventing agent is oxidized before the ingredients of the sealing member 4 are, and thereby exerts an antioxidant effect on the sealing member 4. Here, even if the sealing member 4 undergoes oxidation or thermal decomposition, the sealing member deterioration preventing agent seeps between the molecules of the sealing member 4 and makes the sealing member 4 less likely to contract. This helps suppress cracks in the sealing member 4.

The manufacturing process of the capacitor 1 includes the repair of the oxide film formed on the anode and cathode foils 5 and 7. The repair is performed, for example, by applying a voltage of 35 V between the lead terminals 8 and 9 in a high-temperature environment of 125° C. During the repair of the oxide film at a high temperature, the sealing member deterioration preventing agent that has reached the outer face of the sealing member 4 oxidizes and solidifies to form the coating 17.

That is, during the repair of the oxide film, the outer face of the sealing member 4 is exposed to plenty of air in a high-temperature environment outside the body case 2. Thus the outer face of the sealing member 4 is coated with the coating 17 resulting from its precursor, i.e., the sealing member deterioration preventing agent, solidifying by oxidation, and this makes the entire sealing member 4 unlikely to be exposed to oxygen any longer. This suppresses deterioration of the sealing member 4 by oxidation, and prevents the electrolytic solution from evaporating through cracks and the like in the sealing member 4. It is thus possible to maintain the characteristics of the capacitor 1 stably for a long period.

In addition, the electrolytic solution in liquid form permeates and is present in the part of the sealing member 4 closer to the capacitor element 3 than the coating 17. Thus, even if part of the coating 17 deteriorates, that part is supplied with the electrolytic solution. The sealing member deterioration preventing agent then solidifies and repairs the coating 17. It is thus possible to maintain the characteristics of the capacitor 1 stably for a longer period.

The formation of the coating 17 may be performed concurrently with the repair of the oxide film on the anode and cathode foils 5 and 7, or may be performed in a process different from the repair of the oxide film. In a high-temperature environment, the electrolytic solution is supplied to the sealing member 4 rapidly, and the sealing member deterioration preventing agent oxidizes rapidly. Accordingly, it is preferable that the coating 17 be formed at a temperature of 105° C. or higher, and more preferably 125° C. or higher. In a case where the sealing member deterioration preventing agent is a saturated fatty acid or an ester compound of a saturated fatty acid, which takes time to solidify, it is preferable that the coating 17 be formed at a temperature of 160° C.

For sufficient formation of the coating 17, it is preferable that the high-temperature environment be maintained for 30 minutes or more, and more preferably one hour or more, though at 160° C. or higher, the duration may be shorter.

It is preferable that the concentration of the sealing member deterioration preventing agent in the electrolytic solution be from 1% by weight to 90% by weight. With a concentration less than 1% by weight of the sealing member deterioration preventing agent in the electrolytic solution, oxidation of the sealing member 4 cannot be suppressed for a long period. On the other hand, with a concentration more than 90% by weight of the sealing member deterioration preventing agent in the electrolytic solution, the electrolytic solution has increased viscosity. This increases the time required for the capacitor element 3 to hold the electrolytic solution and the time required to supply the electrolytic solution from the capacitor element 3 to the sealing member 4, leading to increased man-hours for the capacitor 1. A concentration of 3% by weight to 80% by weight of the sealing member deterioration preventing agent in the electrolytic solution is particularly preferable to achieve more effective suppression of oxidation and hence reduced man-hours.

Figure 6:
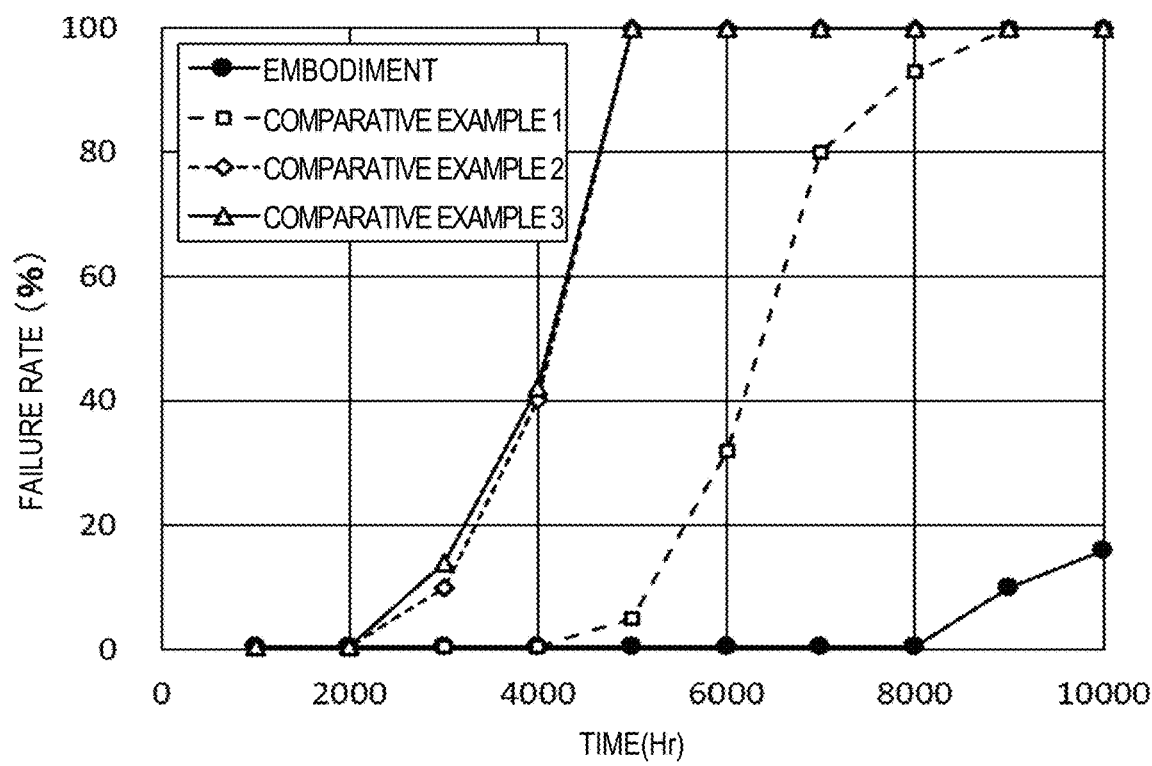
FIG. 6 is a diagram showing the results of durability tests of a capacitor according to the first embodiment of the present invention.

The capacitor 1 was then subjected to durability tests in a high-temperature environment of 150° ° C. to study the failure rate versus time. The results are shown in Table 1 and FIG. 6. In FIG. 6, along the vertical axis is taken the failure rate (in percent), and along the horizontal line is taken time (in hours).

TABLE 1

| Time (Hours) | 1000 | 2000 | 3000 | 4000 | 5000 | 6000 | 7000 | 8000 | 9000 | 10000 |
|---|---|---|---|---|---|---|---|---|---|---|
| Emb. | 0 | 0 | 0 | 0 | 0 | 0 | 0 | 0 | 10 | 16 |
| Comp. 1 | 0 | 0 | 0 | 0 | 5 | 32 | 80 | 93 | 100 | 100 |
| Comp. 2 | 0 | 0 | 10 | 40 | 100 | 100 | 100 | 100 | 100 | 100 |
| Comp. 3 | 0 | 0 | 14 | 42 | 100 | 100 | 100 | 100 | 100 | 100 |

In the capacitor 1 of this embodiment (Emb.) that was subjected to the durability tests, the electrolytic solution contained gamma-butyrolactone as a lipophilic solvent and α-tocopherol as a sealing member deterioration preventing agent. The concentration of the sealing member deterioration preventing agent in the electrolytic solution was 10% by weight. The sealing member 4 of the capacitor 1 was formed of butyl rubber, and contained an anti-aging agent.

The capacitor 1 of comparison example 1 (Comp. 1) differed from that of this embodiment in that the separator 6 and the sealing member 4 were kept out of contact with each other. The capacitor 1 of comparison example 2 (Comp. 2) differed from that of this embodiment in that the electrolytic solution contained no sealing member deterioration preventing agent. The capacitor 1 of comparison example 3 (Comp. 3) differed from that of this embodiment in that the electrolytic solution contained no sealing member deterioration preventing agent and that the separator 6 and the sealing member 4 were kept out of contact with each other For each of those capacitors, 100 samples were subjected to the durability tests. Samples of which the capacitance became lower than 20% of its initial capacitance and samples in which any crack was visually recognized in the outer face of the sealing member 4 were evaluated as failing, and the failure rate was determined.

The durability tests revealed the following. With comparative examples 2 and 3, in which the electrolytic solution contained no sealing member deterioration, in 3000 hours, failures occurred in which the electrolytic solution evaporated through cracks in the sealing member 4 and the capacitance fell sharply. In 5000 hours, with both comparative examples 2 and 3, the failure rate was 100%.

With comparative example 1, in which the sealing member deterioration preventing agent contained in the electrolytic solution was supplied to the sealing member 4, satisfactory characteristics were maintained longer than with comparative examples 2 and 3. However, since the separator 6 was disposed away from the sealing member 4, the sealing member 4 was not stably supplied with the sealing member deterioration preventing agent. This often resulted in the coating 17 being formed insufficiently or deterioration of the coating 17 requiring long time to repair. Accordingly, in 5000 hours, failures occurred and, in 7000 hours, the failure rate was 80%.

In contrast, in the capacitor 1 according to this embodiment, in which the separator 6 was kept in contact with the sealing member 4, the sealing member deterioration preventing agent was constantly supplied to the sealing member 4. Thus the coating 17 was formed stably on the outer face of the sealing member 4, and this helped suppress cracks in a high-temperature environment. Thus no failure occurred even in 8000 hours, and stable characteristics were maintained for a long period.

That is, the coating 17 resulting from the sealing member deterioration preventing agent solidifying coats the outer face of the sealing member 4, and the sealing member deterioration preventing agent contained in the electrolytic solution is supplied through the separator 6 to the sealing member 4. This helped greatly improve the stability of the capacitor 1.

Similar test results was obtained with samples in which the sealing member deterioration preventing agent was vitamin D3 and samples in which the sealing member deterioration preventing agent was tetraglycerol triester of oleic acid.

According to this embodiment, the capacitor element 3 holds an electrolytic solution having a sealing member deterioration preventing agent dissolved in a lipophilic solvent, and the separator 6 makes contact, at a plurality of points or over an area, with the face of the sealing member 4 facing the capacitor element 3 so as to rest on that face. The sealing member 4 is permeated with the electrolytic solution supplied through the separator 6, and the outer face of the sealing member 4 is coated with the coating 17 resulting from the sealing member deterioration preventing agent solidifying by oxidation. This makes it possible to suppress deterioration of the sealing member 4 through oxidation for a long period. It is thus possible to prevent the electrolytic solution held in the capacitor element 3 from leaking out, and to maintain the characteristics of the capacitor 1 stably for a long period.

The electrolytic solution permeates and is present in the part of the sealing member 4 closer to the capacitor element 3 than the coating 17. Thus, even if part of the coating 17 deteriorates, that part is supplied with the electrolytic solution. The sealing member deterioration preventing agent then solidifies and repairs the coating 17. It is thus possible to maintain the characteristics of the capacitor 1 stably for a longer period.

The sealing member deterioration preventing agent may be a lipid-soluble vitamin. It is then easy to obtain a sealing member deterioration preventing agent that solidifies by oxidation to form the coating 17.

The concentration of the sealing member deterioration preventing agent in the electrolytic solution may be from 1% by weight to 90% by weight. It is then possible to suppress an increase in man-hours and to suppress deterioration of the sealing member 4 for a long period.

The concentration of the sealing member deterioration preventing agent in the electrolytic solution may be from 3% by weight to 80% by weight. It is then possible to further suppress an increase in man-hours and to suppress deterioration of the sealing member 4 for a long period.

The lipophilic solvent in the electrolytic solution may be gamma-butyrolactone. It is then easy to obtain an electrolytic solution having a sealing member deterioration preventing agent dissolved in it.

The lipophilic solvent in the electrolytic solution may contain at least one of sulfolane, ethylene glycol, and diethylene glycol along with a nonionic surfactant. It is then easy to obtain an electrolytic solution having a sealing member deterioration preventing agent dissolved in it.

The lipophilic solvent in the electrolytic solution may be polyethylene glycol having a lipophilic group bonded thereto, or a copolymer of polyethylene glycol with polypropylene glycol. It is then easy to obtain an electrolytic solution having a sealing member deterioration preventing agent dissolved in it.

The separator 6 may protrude beyond the anode and cathode foils 5 and 7 toward the sealing member 4. The separator 6 can then reliably make contact, at a plurality of points or over an area, with the sealing member 4 so as to rest on it.

A central part of the face of the sealing member 4 facing the capacitor element 3 may protrude relative to a peripheral part of that face. The separator 6 can then more reliably make contact with the sealing member 4.

The ridge 13a of the constriction 13 that protrudes inward from the inner face of the body case 2 is located farther from the capacitor element 3 than the middle 4a of the sealing member 4 in its thickness direction. It is thus easy to form a sealing member 4 of which a central part of the face facing the capacitor element 3 protrudes relative to a peripheral part of that face.

Since the top face (facing the capacitor element 3) of the sealing member 4 bulges, the bottom face (facing away from the capacitor element 3) of it dents. Thus the bottom face of the sealing member 4 has, in a part of it where it dents relative to a flat plane, a larger surface area, giving a larger contact area between the coating 17, which covers the bottom face of the sealing member 4, and the sealing member 4. This helps enhance the bond strength between the sealing member 4 and the coating 17. It is thus possible to reliably prevent the solution held in the capacitor element 3 from leaking out, and to maintain the characteristics of the capacitor 1 stably for a long period.

Instead, giving the bottom face of the sealing member 4 a shape that bulges outward in a central part of it also results in the bottom face of the sealing member 4 having an increased surface area. This, too, gives a larger contact area between the coating 17 and the sealing member 4, achieving effects similar to those mentioned above.

Second Embodiment

Next, a second embodiment will be described. In this embodiment, the capacitor element 3 holds, instead of an electrolytic solution, a solid electrolyte (not shown) and a predetermined functional liquid. In other respects the second embodiment is similar to the first embodiment.

The solid electrolyte is composed of an electrically conductive polymer or the like. The electrically conductive polymer helps reduce the ESR of the capacitor 1. Usable as the electrically conductive polymer is, for example, polythiophene, polypyrrole, or a derivative of any of those. Polyethylene dioxy thiophene is particularly preferable for its high electrical conductivity.

Immersing the capacitor element 3 in a dispersion liquid of the electrically conductive polymer for a predetermined length of time and then drying the result permits the solid electrolyte composed of the electrically conductive polymer to be held between the anode and cathode foils 5 and 7.

Also held between the anode and cathode foils 5 and 7 is a functional liquid with a function of increasing the withstand voltage of the capacitor 1. The functional liquid is a solution having a sealing member deterioration preventing agent dissolved in a lipophilic solvent. As the lipophilic solvent, gamma-butyrolactone can be used. Also usable is a lipophilic solvent containing at least one of sulfolane, ethylene glycol, and diethylene glycol along with a nonionic surfactant. Also usable as the lipophilic solvent is polyethylene glycol having a lipophilic group bonded to it, or a copolymer of polyethylene glycol with polypropylene glycol. Any of these lipophilic solvents helps increase the withstand voltage, and permits the sealing member deterioration preventing agent to dissolve.

As mentioned previously, usable as the sealing member deterioration preventing agent is a lipid-soluble vitamin, an unsaturated fatty acid, a polyglycerol ester containing a unsaturated fatty acid group within the molecule, a saturated fatty acid, or a derivative of any of those. To ease dissolution of such a sealing member deterioration preventing agent in the lipophilic solvent, an amphiphilic compound may be added.

Examples of lipophilic vitamins include vitamin A (retinol, α-carotene, β-carotene, β-cryptoxanthin), vitamin D (vitamin D2, vitamin D3), vitamin E (tocopherol, tocotrienol), and vitamin K (vitamin K1, vitamin K2, menaquinone-7).

The solid electrolyte becomes swollen with the functional liquid. This provides an increased degree of close contact of the solid electrolyte with the anode and cathode foils 5 and 7, between which the solid electrolyte is held. This helps reduce the ESR of the capacitor 1. Thus the functional liquid also has a function of reducing the ESR of the capacitor 1.

As in the first embodiment, the separator 6 in the capacitor element 3 makes contact, at a plurality of points or over an area, with the top face (facing the capacitor element 3) of the sealing member 4 so as to rest on that face. The sealing member 4 is constantly supplied with the functional liquid through the separator 6. The functional liquid permeates the sealing member 4 through intermolecular gaps inside it to reach the outer face (facing away from the capacitor element 3) of the sealing member 4. The outer face of the sealing member 4 is coated with the coating 17 (see FIG. 3) resulting from the sealing member deterioration preventing agent solidifying by oxidation.

This makes the entire sealing member 4 unlikely to be exposed to oxygen outside the body case 2, and helps suppress deterioration of the sealing member 4 through oxidation. This makes it possible to prevent the electrolytic solution from evaporating through cracks and the like in the sealing member 4. It is thus possible to maintain the characteristics of the capacitor 1 stably for a long period.

According to this embodiment, the capacitor element 3 holds a functional liquid having a sealing member deterioration preventing agent dissolved in a lipophilic solvent, and the separator 6 makes contact with the sealing member 4. The sealing member 4 is permeated with the functional liquid supplied through the separator 6, and the outer face of the sealing member 4 is coated with the coating 17 resulting from the sealing member deterioration preventing agent solidifying by oxidation. This makes it possible to suppress deterioration of the sealing member 4 through oxidation for a long period. It is thus possible to prevent the functional liquid held in the capacitor element 3 from leaking out, and to maintain the characteristics of the capacitor 1 stably for a long period.

The functional liquid permeates the part of the sealing member 4 closer to the capacitor element 3 than the coating 17. Thus, even if part of the coating 17 deteriorates, that part is supplied with the functional liquid. The sealing member deterioration preventing agent then solidifies and repairs the coating 17. It is thus possible to maintain the characteristics of the capacitor 1 stably for a longer period.

While in this embodiment the functional liquid has a function of increasing the withstand voltage of the capacitor 1, it may instead have a function of enhancing any other characteristics of the capacitor 1.

Instead of the functional liquid, an electrolytic solution like that in the first embodiment may be held between the anode and cathode foils 5 and 7. Holding the solid electrolyte along with the electrolytic solution between the anode and cathode foils 5 and 7 helps enhance the function of repairing oxide film and further reduce the ESR of the capacitor 1.

INDUSTRIAL APPLICABILITY

The present invention finds applications in capacitors such as electrolytic capacitors, and in vehicles, electronic devices, and the like that includes capacitors mounted on their circuits.

REFERENCE SIGNS LIST

1 capacitor
2 body case
2*b* opening
3 capacitor element
4 sealing member
5 anode foil
6 separator
7 cathode foil
8, 9 lead terminal
10, 11 through hole
12 tape
13 constriction
13*a* ridge
14 replication portion
15 seat plate
16 through hole
17 coating

What is claimed is:

1. A method of preventing oxidation-induced deterioration of a sealing member in a capacitor including:
  a capacitor element holding a predetermined solution between an anode foil and a cathode foil that are wound up with a separator in between;
  a body case for housing the capacitor element; and
  the sealing member for sealing the body case,
  wherein
  the solution contains, dissolved in a lipophilic solvent, a sealing member deterioration preventing agent that solidifies by oxidation, the solution being supplied through the separator to the sealing member, and
  the sealing member deterioration preventing agent permeates the sealing member and reaches an outer face of the sealing member to form on the outer face of the sealing member a coating resulting from the sealing member deterioration preventing agent solidifying, thereby preventing oxidation-induced deterioration of the sealing member, and
  the SP value of the sealing member deterioration preventing agent falls between the SP value of the lipophilic solvent and the SP value of the sealing member.

2. The method according to claim 1, wherein the sealing member deterioration preventing agent contained in the solution in the capacitor element is constantly supplied to the sealing member.

3. The method according to claim 1, wherein the sealing member deterioration preventing agent is a terpenoid, an unsaturated fatty acid, a saturated fatty acid, or a derivative of any thereof.

4. The method according to claim 1, wherein the sealing member deterioration preventing agent is a lipid-soluble vitamin.

5. The method according to claim 1, wherein the solution is an electrolytic solution having the sealing member deterioration preventing agent and an electrolyte dissolved in the lipophilic solvent.

6. The method according to claim 5, wherein a concentration of the sealing member deterioration preventing agent in the electrolytic solution is from 1% by weight to 90% by weight.

7. The method according to claim 5, wherein a concentration of the sealing member deterioration preventing agent in the electrolytic solution is from 3% by weight to 80% by weight.

8. The method according to claim 5, wherein the lipophilic solvent is gamma-butyrolactone.

9. The method according to claim 1, wherein the lipophilic solvent contains at least one of sulfolane, ethylene glycol, and diethylene glycol along with a nonionic surfactant.

10. The method according to claim 1, wherein the lipophilic solvent is polyethylene glycol having a lipophilic group bonded thereto, or a copolymer of polyethylene glycol with polypropylene glycol.

11. The method according to claim 1, wherein a width of the separator in a lateral direction is greater than a width of the anode and cathode foils in the lateral direction, and the separator protrudes beyond the anode and cathode foils toward the sealing member.

12. The method according to claim 11, wherein a central part of the face of the sealing member facing the capacitor element protrudes relative to a peripheral part thereof.

13. The method according to claim 12, wherein the body case has a constriction that protrudes from an inner face of the body case and that presses an outer circumferential face of the sealing member, and a ridge of the constriction is located farther from the capacitor element than a middle of the sealing member in a thickness direction thereof.

14. The method according to claim 1, wherein a part of the separator bends so as to make contact with the face of the sealing member facing the capacitor element without applying stress to the anode and cathode foils.

* * * * *